(12) United States Patent
Wiktor et al.

(10) Patent No.: US 7,259,687 B2
(45) Date of Patent: Aug. 21, 2007

(54) SYSTEM AND METHOD FOR DISTRIBUTING MODULE PHASE INFORMATION

(75) Inventors: Stefan W. Wiktor, Raleigh, NC (US); Xuening Li, Cary, NC (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 11/255,312

(22) Filed: Oct. 21, 2005

(65) Prior Publication Data

US 2007/0091658 A1   Apr. 26, 2007

(51) Int. Cl.
*G08B 21/00* (2006.01)
*H03K 13/02* (2006.01)
(52) U.S. Cl. .................. 340/825.78; 340/537; 324/609
(58) Field of Classification Search .......... 340/825.78, 340/537; 324/609
See application file for complete search history.

(56) References Cited

U.S. PATENT DOCUMENTS

| | | | | |
|---|---|---|---|---|
| 4,231,020 A | * | 10/1980 | Azzis et al. | 341/120 |
| 4,575,714 A | * | 3/1986 | Rummel | 340/468 |
| 6,788,036 B1 | * | 9/2004 | Milavec et al. | 323/272 |

* cited by examiner

*Primary Examiner*—Bao Q. Vu
(74) *Attorney, Agent, or Firm*—Wade J. Brady, III; Frederick J. Telecky, Jr.

(57) ABSTRACT

A multi-module DC-DC converter provides synchronization between modules based on identification of a module within a chain. A resistor network can be used for the chain so that each module obtains a particular voltage based on its position within the chain. A master module provides a source current to drive the chain so that each module can determine its relative position in the chain based on voltage readings. With this configuration, a master module can determine how many modules are in the chain, and each slave module can determine its relative position in the chain. The module information contributes to synchronization between the modules for use in current ripple cancellation, for example, in the multi-module DC-DC converter.

19 Claims, 4 Drawing Sheets

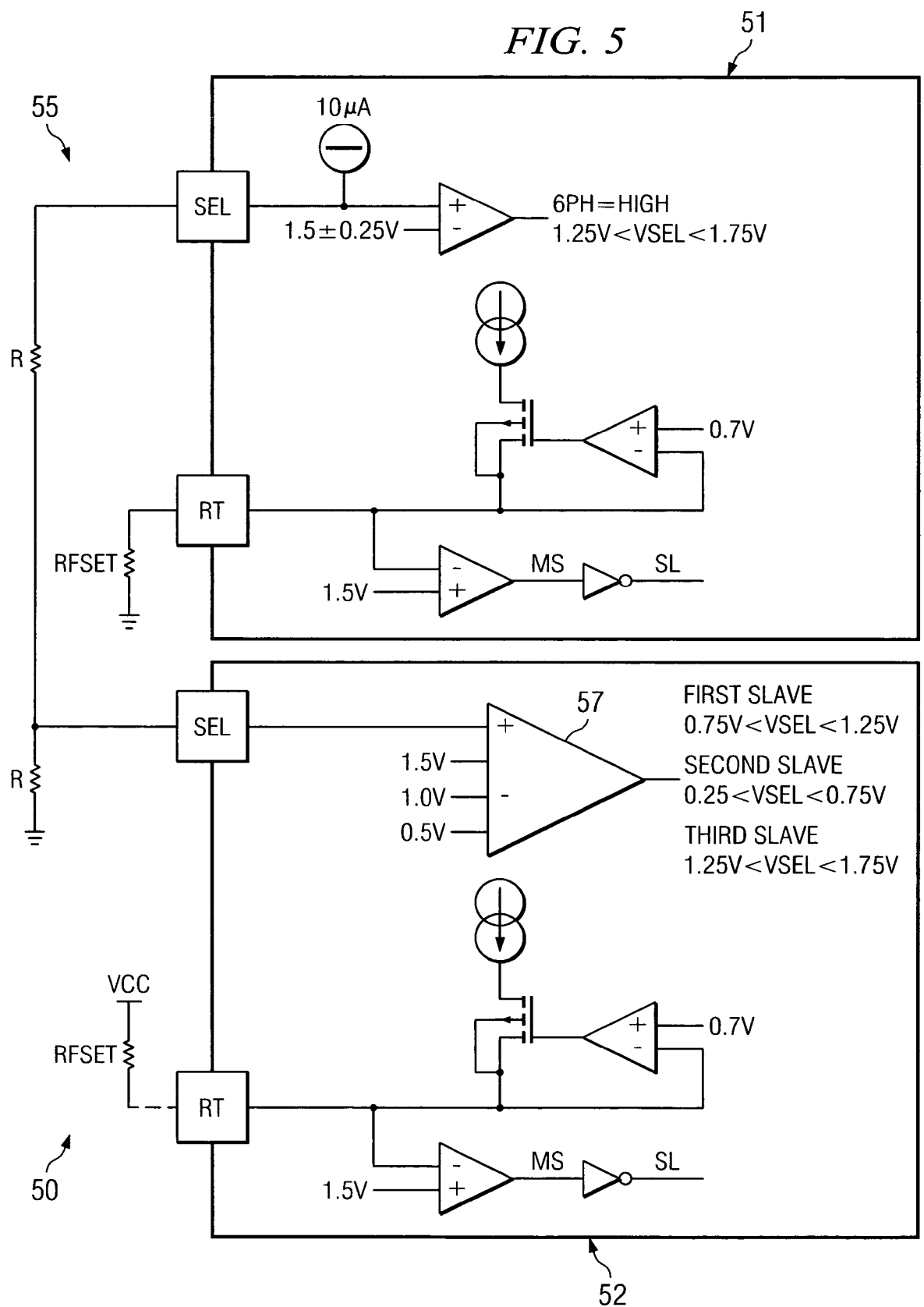

SYSTEM AND METHOD FOR DISTRIBUTING MODULE PHASE INFORMATION

CROSS REFERENCE TO RELATED APPLICATIONS

N/A

STATEMENT REGARDING FEDERALLY SPONSORED RESEARCH OR DEVELOPMENT

N/A

BACKGROUND OF THE INVENTION

1. Field of the Invention

The present invention relates generally to distributing phase information among a number of controllers and relates more particularly to distributing clock phase information among multiple controllers for appropriate synchronization.

2. Description of Related Art

DC-DC converters supply power in a variety of applications, including modular power supplies. Computer or digital equipment applications often call for DC-DC power converters capable of handling widely varying loads. Solutions for these applications sometimes involve specifying large capacity power converters, or high performance power converters. One flexible solution relates to a power converter arranged as a group of modules where modules may be added or removed to meet power specifications.

One goal in providing a power to a system using DC-DC converters is to minimize output current ripple. One technique for reducing input and output current ripple in a multi-module environment is to offset switching phases within the modules to achieve ripple current cancellation. By switching the various modules so that they have synchronous offset phases, the output ripple current tends to be cancelled among the different phases, thereby reducing input and output ripple current. Reductions in input and output ripple current permits smaller capacitors to be used with the power control modules, significantly reducing size and cost for the systems.

One challenge in maintaining synchronous offset phases among the modules stems from the flexibility of the multi-module DC-DC converter. The clock and phase information used by the modules depends on the number of modules used. The number of modules indicates how the clock and phase information is split up to set appropriate switching cycles for synchronized phase offset in the modules to produce ripple current cancellation. In particular, if modules are constructed to be swapped in and out of a system, or ganged together to meet the demands of a power application, distribution of the clock and phase information among the modules becomes extremely difficult, since there is a lack of knowledge of the arrangement of the modules. Prior solutions to overcome this difficulty call for rewiring or manually configuring the multiple module power converter.

It is therefore desirable to procure a method for properly distributing a clock and phase information among multiple modules in a DC-DC converter system.

SUMMARY OF THE INVENTION

In accordance with the present invention, there is provided a data transmission and addressing protocol between modules to process clock and phase information. A clock input/output (IO) stream is used to deliver timing data to the different modules. Addressing for modules is attained through a simple resistor network, in which each module is separated by a resistor and the last module in the series has a resistor tied to ground. The resistors in the interconnected modules form a resistor chain that is used to address the modules based on a reference current.

According to an exemplary embodiment of the present invention, the DC-DC converter modules are arranged in a master-slave configuration. A master module provides a reference current to the resistor network constructed between the various modules. By sensing information related to the reference current, the master module can determine the number of slave modules in the chain. Each slave module in the chain is also able to determine its address, or position, in the chain.

By providing a resistor chain between the modules in a master-slave configuration, module addressing is self-configurable and does not require circuit changes as modules are added or removed from the power system.

BRIEF DESCRIPTION OF THE DRAWINGS

The invention is described in greater detail below with reference to the accompanying drawings, in which:

FIG. 5 is a circuit block diagram illustrating selection of a module in a DC-DC power converter system.

DETAILED DESCRIPTION OF THE PREFERRED EMBODIMENTS

Figure 1:
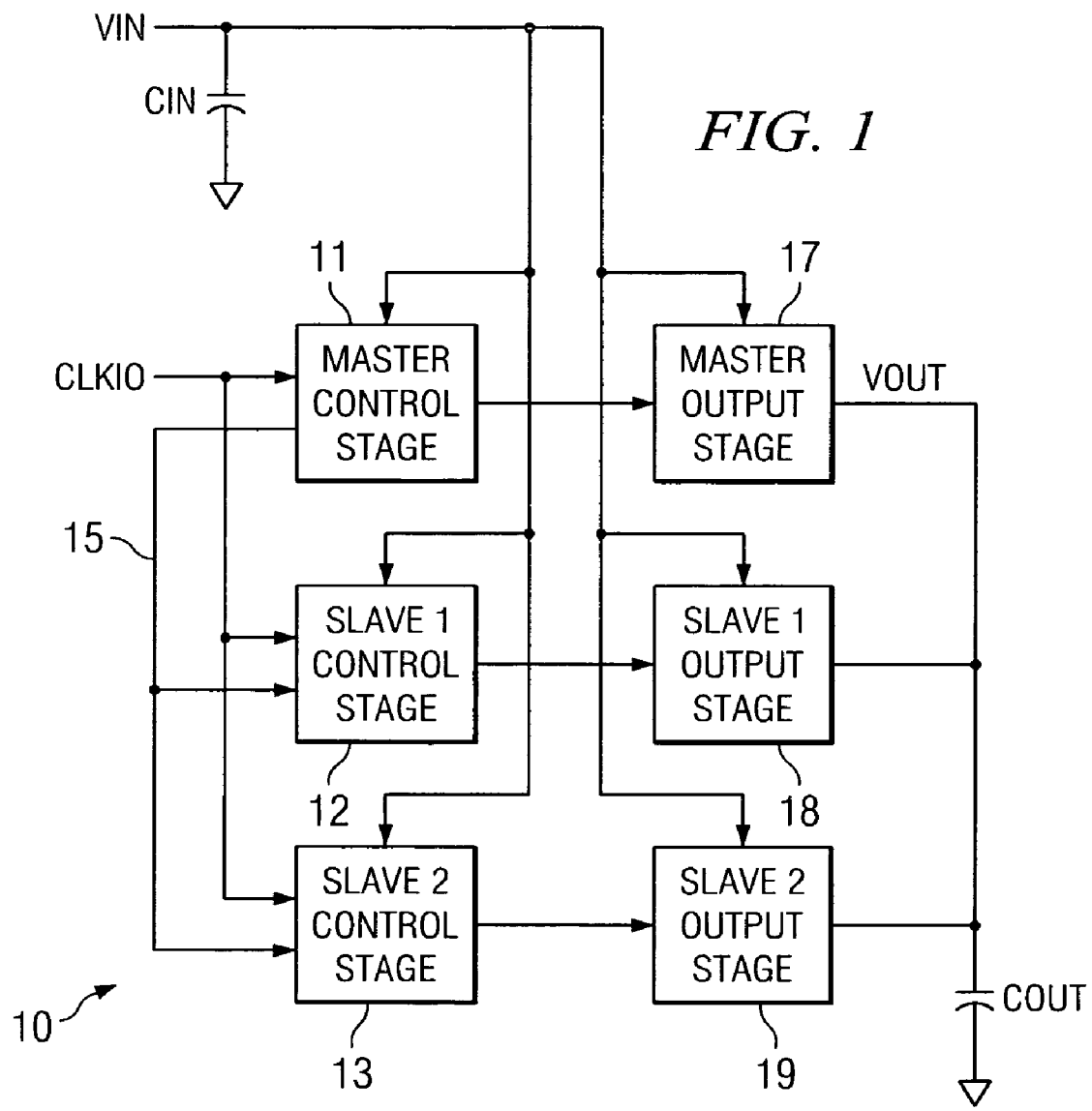
FIG. 1 is a block diagram of a DC-DC converter with multiple converter modules.

Referring now to FIG. 1, an exemplary embodiment of a multiple module DC-DC converter is illustrated in block diagram form as converter 10. Converter 10 is illustrated as a three-module converter, in which the output stages are operated out of phase by 120°. A number of different phases can be realized with this type of multiple module DC-DC converter, with the phase separation being adjusted appropriately. In accordance with the present invention, any number of phases or modules can be accommodated in producing a multiple module DC-DC converter.

Converter 10 consists of three different control stages, 11-13, for three different output stages 17-19. Control stages 11-13 drive respective output stages 17-19 out of phase with each other to achieve a reduced ripple current on input $V_{IN}$ as well as a reduced output current for output $V_{OUT}$. With a reduced ripple current on the input and output, capacitors $C_{IN}$ and $C_{OUT}$ can be reduced in size or rating to significantly reduce cost and size of converter 10.

Control stages 11-13 receive a clock input signal CLKIO that includes timing and phase information used by control stages 11-13 for driving respective output stages 17-19. By selecting various portions of clock signal CLKIO for triggering operation of output stages 17-19, control stages 11-13 can realize a multiple module, multiphase power converter. In addition, due to the architecture of converter 10, modules can be added or removed to meet the power demands of the given application. In selecting a portion of clock signal CLKIO for driving a respective output stage, control stages 11-13 are addressed to be selected to use a particular portion of clock signal CLKIO. Master control stage 11 produces a selection or addressing signal 15 used to determine an appropriate control for the desired portion of clock signal CLKIO. Selection signal 15 provides a very simple addressing or selection scheme among the various control stages and is configured to permit control and output stages to be added or removed as modules in power converter 10.

The simplicity of addressing for selection signal 15 and flexibility with respect to adding or removing modules is attained through a component network chain. Each control stage 11-13 includes a component in the path of selection signal 15, so that each control stage is identified by a particular position within the component chain. Master control stage 11 provides signal 15 to generate value responses for each component in the component chain. For example, the components may be passive, such as resistors, which generate a voltage that differs based on their location in the chain when signal 15 is applied. The components can be active, such as diodes or transistors, or other passives, such as inductors or capacitors.

Figure 2:
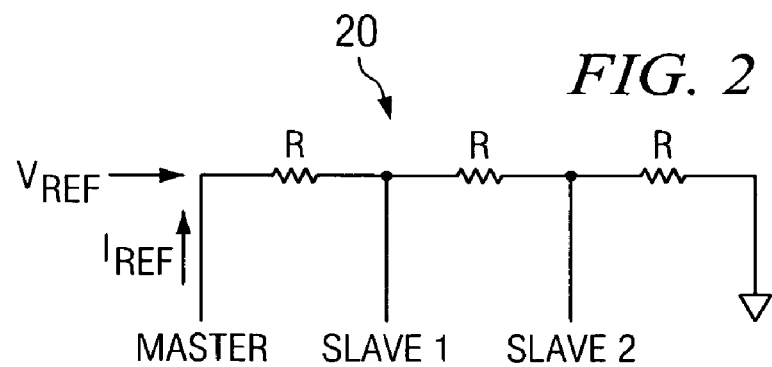
FIG. 2 is a partial circuit diagram of a resistor network chain.

Referring to FIG. 2 for a moment, a resistor network chain 20 illustrates the addressing mechanism in accordance with the present invention. A reference current IREF applied by a master to one end of the chain generates different voltages at each point where a connection is made between resistors R. For example, the point indicated as master receives a voltage VREF that is higher than the point indicated as slave1, which in turn has a higher voltage than the point indicated as slave2. Each control stage connected to the resistor network can therefore determine its position in the chain, and the master control stage can determine the number of modules in the converter.

Figure 3:
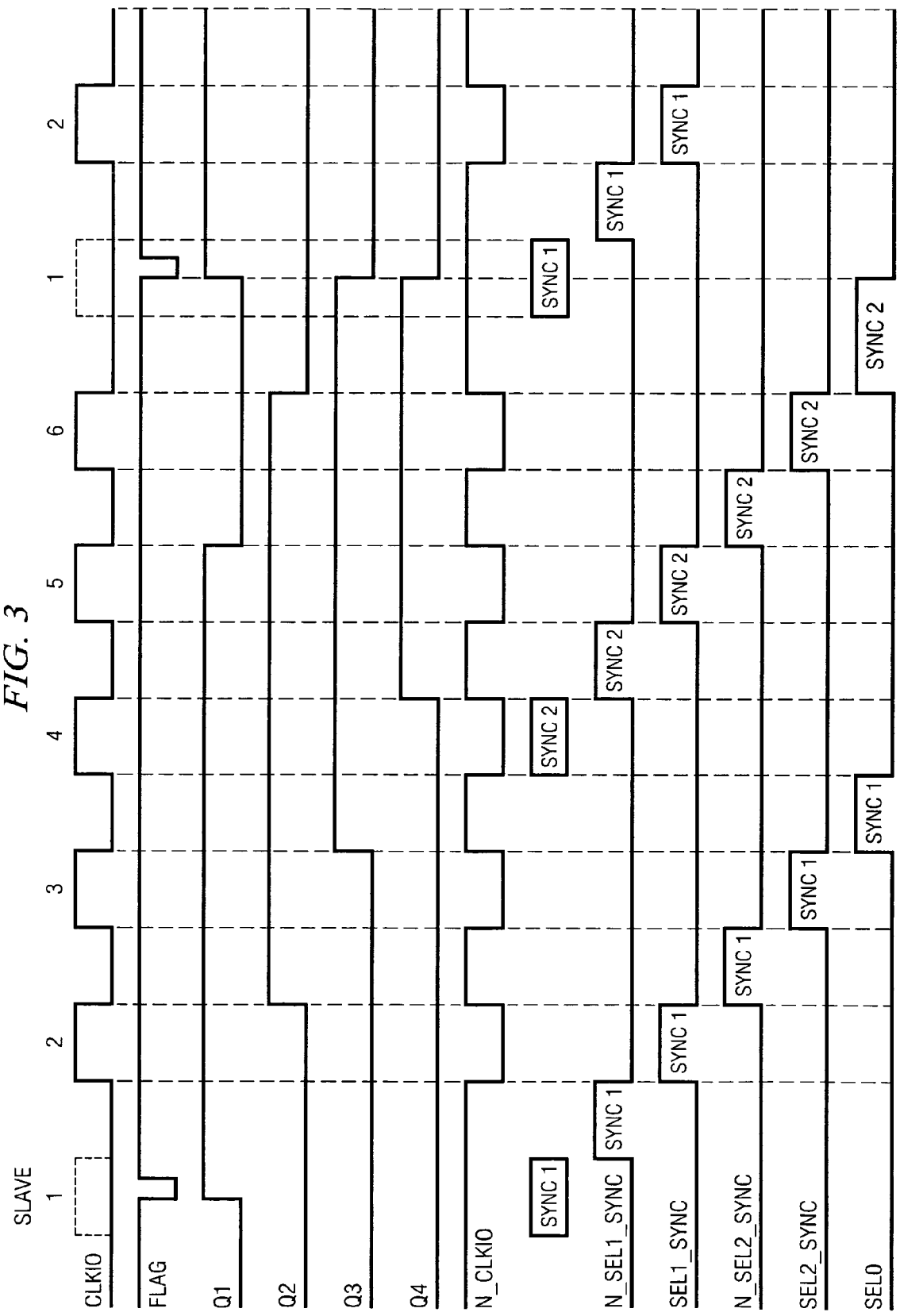
FIG. 3 is a timing diagram illustrating module timing for three phase operation of a converter with three modules.

Referring now to FIG. 3, synchronization of the various stages in a three-module converter is illustrated. Clock signal CLKIO is delivered to a slave module for operation of the module output. The slave module begins operation with a flag signal that prompts the operation of a first power switch. The flag signal in an apparent clock pulse provided through clock signal CLKIO. Once switches in the slave module begin switching, pulse edges from clock signal CLKIO are used to trigger additional switching events. As indicated in FIG. 3, there are six synchronization events for lining up the switching operations of the different modules.

Figure 4:
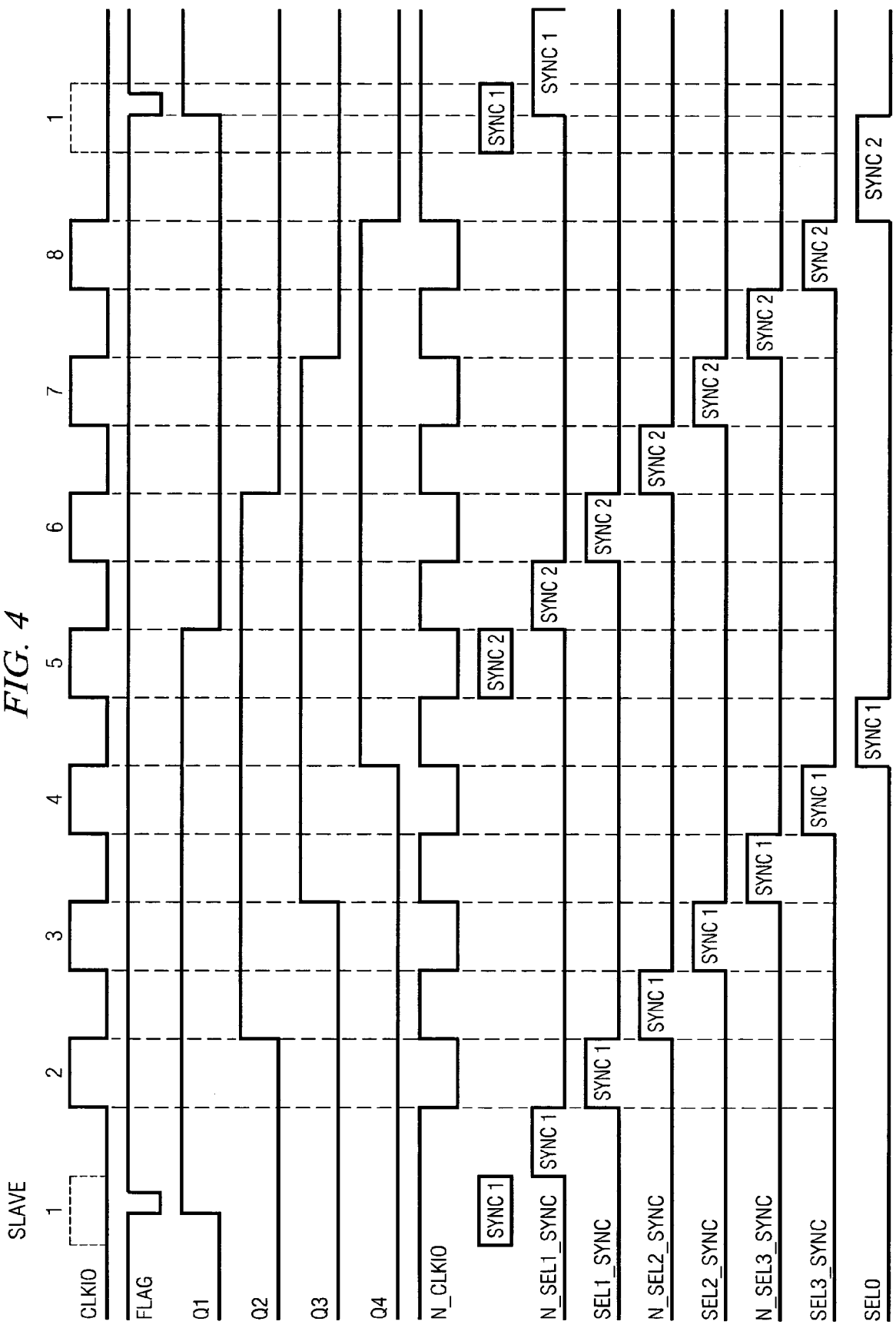
FIG. 4 is a timing diagram of control signals for a four phase converter with four modules.

Referring now to FIG. 4, a similar timing diagram is illustrated for a four-module power converter. There are eight different synchronization indications provided in the timing diagram of FIG. 4, and eight apparent cycles in the clock signal CLKIO.

Referring now to FIG. 5, a single master and slave module selection configuration is illustrated as converter 50. Converter 50 includes a master module 51 and a slave module 52 ganged together to make up a multi-module DC-DC power converter. In accordance with the present invention, master module 51 sources a current to resistor chain 55 to address the modules in multi module converter 50. By providing a reference current illustrated as a 10 µA current to the resistor chain, master module 51 can determine how many slaves are present in the resistor chain. Since the reference current is known, the voltage generated by sourcing the reference current to the resistor chain produces an identification of the number of modules connected in the resistor chain. It should be apparent that any sufficient current source may be used, including an exemplary 20 µA source.

In addition, each slave module, such as slave module 52, senses a particular voltage based on its position in the resistor chain, to determine its address selection. Each slave module 52 is provided with a comparator in an exemplary embodiment that determines a position of slave module 52 in resistor chain 55 based on a sensed voltage. The sensed voltage is applied to comparator 57 which provides an output that signals the position of module 52 in the resistor chain.

If an additional module is added to converter 50, an additional resistor appears in resistor chain 55. The voltage sensed by master module 51 changes accordingly, as does the voltage sensed by slave module 52 if the added module is further down in resistor chain 55. Similarly, removal of a module from converter 50 produces a change in sensed voltage for master module 51 and any other module higher in resistor chain 55 than the removed module. The arrangement of modules in a multi-module DC-DC power converter with reference to a position sensitive resistor chain thus provides a simple mechanism for controlling synchronization of module outputs to attain current ripple cancellation on an input and output of the converter. This configuration permits simple addition or removal of modules in the multi module converter without substantially reconfiguring the converter to accommodate the phase changes that are dependent upon the number of modules. Accordingly, multi module DC-DC converters can be constructed to meet the needs of a given application simply by selecting a number of modules that are combined together to produce a desired power output.

Although the present invention has been described in relation to particular embodiments thereof, other variations and modifications and other uses will become apparent to those skilled in the art from the description. It is intended therefore, that the present invention not be limited not by the specific disclosure herein, but to be given the full scope indicated by the appended claims.

What is claimed is:

1. A system for identifying modules in a DC-DC power converter with a plurality of modules, comprising:
   a component chain coupled between a first module and a last module, with at least one component provided between the first and last modules;
   a component coupled to the last module and to a common reference; and
   a signal source in the first module for supplying a signal to the component chain to stimulate a component response, whereby each module coupled to the component chain receives a different value based on a component response associated with each module to identify each module in the component chain.

2. A system according to claim 1, further comprising:
   a second module coupled between the first and last modules in the component chain; and
   a component in the component chain coupled to the second module for identifying a position of the second module in the component chain.

3. The system according to claim 1, wherein the components are resistors.

4. The system according to claim 1, wherein the last module further comprises a comparator coupled to the component for determining a position of the last module in the component chain.

5. The system according to claim 1, wherein the component chain identifies each module for synchronization of output to contribute to current ripple cancellation in one or more of an input or output of the converter.

6. A method for identifying a module in a multiple module device for synchronization between the modules comprising:
- transmitting a signal to a component network composed of substantially similar components and arranged in a chain;
- generating a value at each component in the chain for identification of a chain position; and
- sensing values generated at the components by modules coupled to the components, whereby each module can identify a position in the chain to which it is coupled.

7. The method according to claim 6, wherein the components are passive components.

8. The method according to claim 7, wherein the components are resistors.

9. The method according to claim 6, further comprising comparing the generated value in each module to a predetermined value to determine relative position within the chain.

10. The method according to claim 6, further comprising providing an output at each module synchronized with the plurality of modules based on identification of position within the chain.

11. An addressing configuration for a multiple module system for synchronizing the modules, comprising:
- a component chain coupled to each module;
- a component being coupled between successive modules for generating a value for a module based on a position at which the module is coupled to the chain;
- a terminating component coupled to the chain and to a reference value for indicating an end of the chain; and
- a terminating module coupled to the terminating component for identifying an end of the chain.

12. The configuration according to claim 11, wherein the modules further comprise DC-DC power converters and each power converter is identified based on position in the chain.

13. The configuration according to claim 11, wherein the components are resistors.

14. The configuration according to claim 11, wherein one module provides a signal to the component chain to generate values receivable by the remaining modules for identification of a position of each module in the component chain.

15. The configuration according to claim 11, further comprising a comparator in one or more of the modules for receiving the generated value and determining relative position within the component chain based on the result of a comparison with a predetermined value.

16. The configuration according to claim 11, wherein each module is operable to provide an output synchronized with the other modules based on a respective position in the chain.

17. The configuration according to claim 14, wherein the signal is one or more of a current or voltage.

18. The system according to claim 1, wherein the signal source is one or more of a current source or a voltage source.

19. The method according to claim 6, wherein the signal is one or more of a current or a voltage.

* * * * *